United States Patent [19]
Zollo et al.

[11] Patent Number: 4,848,777
[45] Date of Patent: Jul. 18, 1989

[54] PRESSURE ENERGIZED/PRESSURE INTENSIFIED CASING SEAL

[75] Inventors: David A. Zollo, Houston; Roy W. Benefield, Magnolia, both of Tex.; David E. Cain, Edinburgh, Scotland; Phillip F. Huang, Houston; Brenda K. Montemayor, Houston, both of Tex.; Ray Myers, Slidell, La.; Stephen L. Neeld, Spring, Tex.; John C. Vicic, Santa Cruz, Calif.; Don B. Wafer, Houston, Tex.

[73] Assignee: FMC Corporation, Chicago, Ill.

[21] Appl. No.: 99,377

[22] Filed: Sep. 18, 1987

[51] Int. Cl.⁴ .................. F16J 15/10; E21B 33/00; F16L 17/00
[52] U.S. Cl. .................. 277/188 A; 277/195; 277/198; 285/140; 285/335; 285/351
[58] Field of Search ............. 277/117, 188 A, 188 R, 277/119–122, 193, 195, 198; 285/140, 351, 335, 348; 166/82, 84

[56] References Cited

U.S. PATENT DOCUMENTS

| | | | |
|---|---|---|---|
| 1,725,836 | 8/1929 | Solberg | 277/188 A |
| 3,071,386 | 1/1963 | Scannell | 277/188 A X |
| 3,492,009 | 1/1970 | Beresnev et al. | 277/125 X |
| 4,262,690 | 4/1981 | Binegar | 277/117 X |
| 4,436,316 | 3/1984 | Karr, Jr. | 277/188 A X |
| 4,532,987 | 8/1985 | Reed | 285/348 X |
| 4,645,214 | 2/1987 | Copley | 285/351 |

Primary Examiner—Allan N. Shoap
Attorney, Agent, or Firm—Lloyd B. Guernsey; R. C. Kamp; R. B. Megley

[57] ABSTRACT

A casing seal for use with a source of high pressure fluids with apparatus for preventing shredding of the seal with variations in fluid pressure. A T-shaped annular metal ring provides a multiplication of fluid pressure so pressure exerted on an elastomeric sealing ring is greater than the fluid pressure. This multiplication prevents gases from entering the elastomer and prevents shredding of the elastomer when pressure is released. The multiplication of pressure also forces the elastomer firmly against a casing and a casing head to provide a fluid-tight seal.

2 Claims, 2 Drawing Sheets

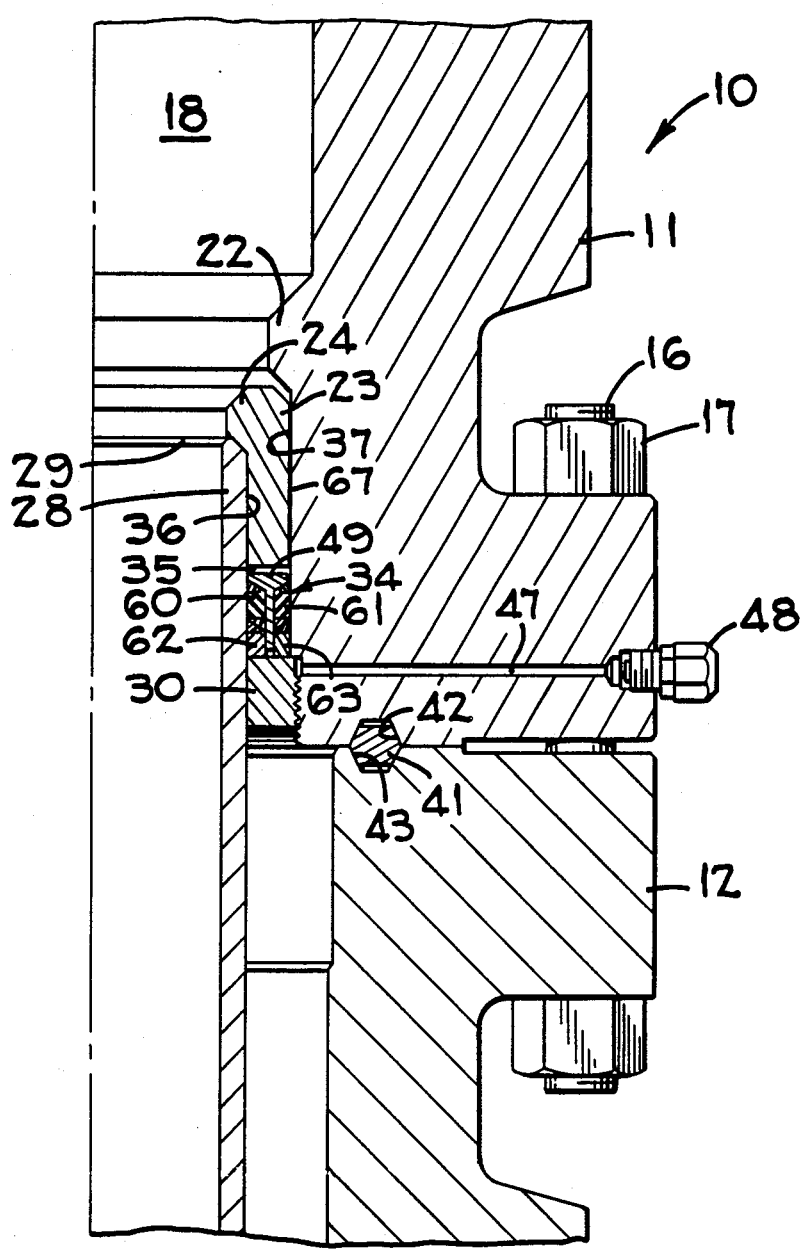
FIG_1

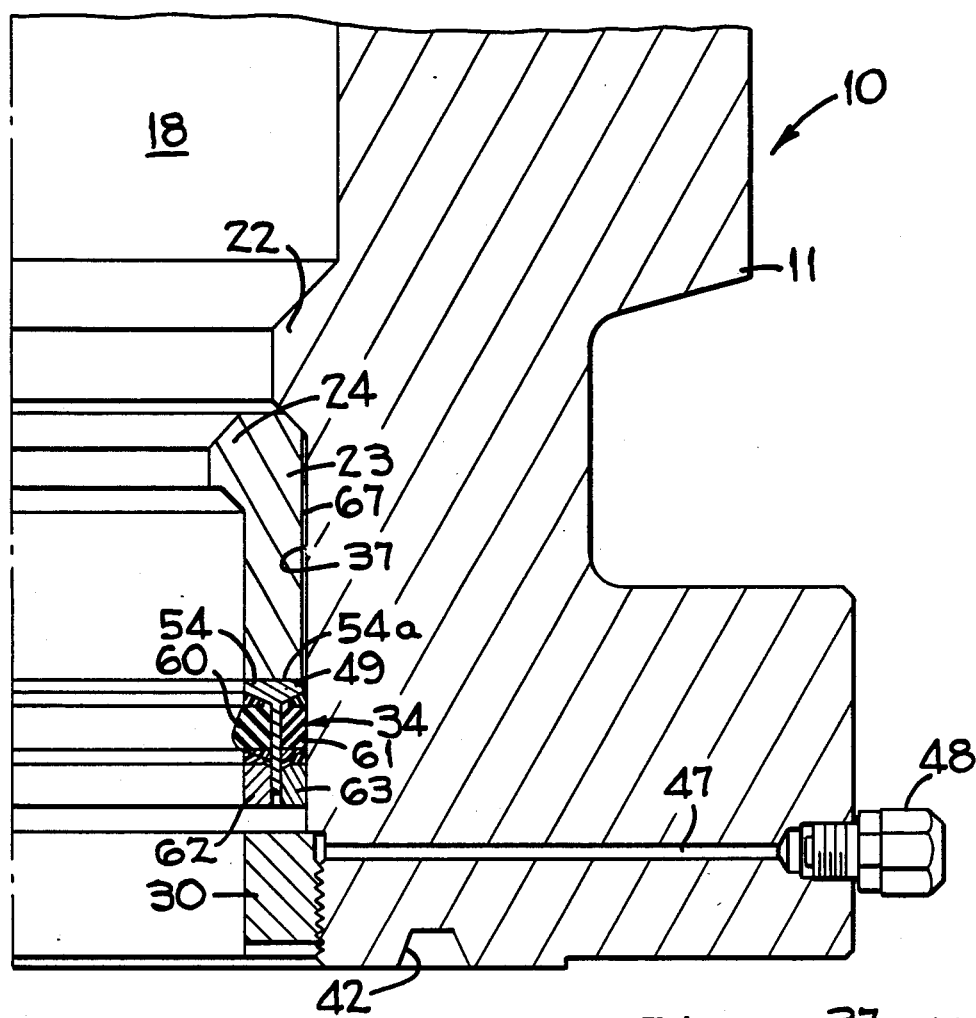
FIG_2
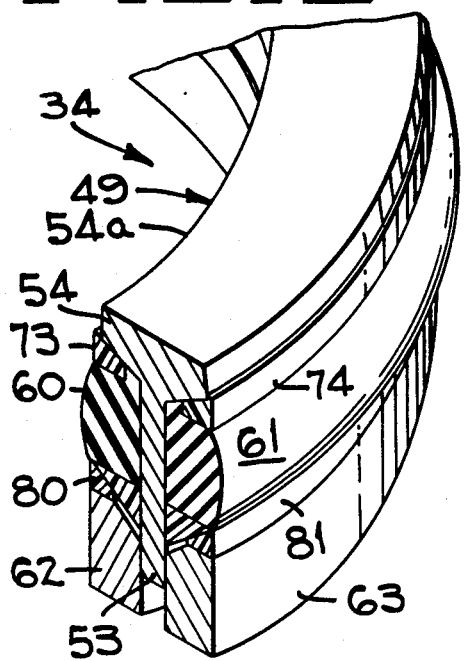
FIG_3
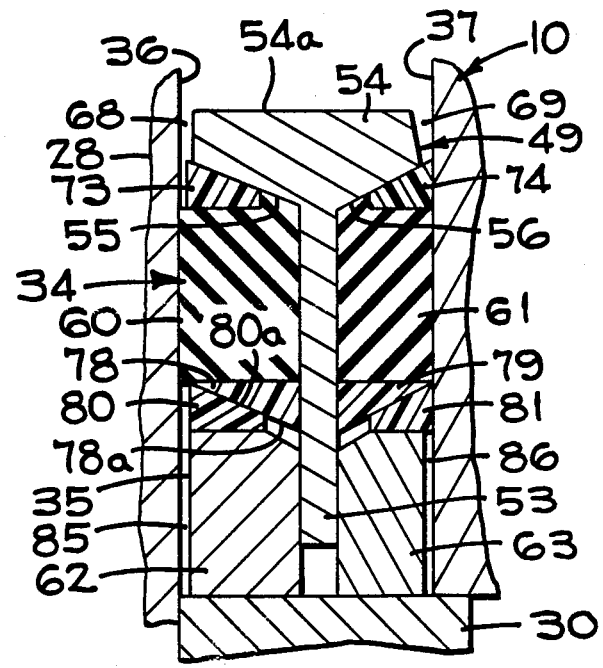
FIG_4

PRESSURE ENERGIZED/PRESSURE INTENSIFIED CASING SEAL

BACKGROUND OF THE INVENTION

The present invention pertains to apparatus for sealing leaks between a casing and a casing head and more particularly, to a seal which intensifies the pressure inside the casing seal to create improved sealing action.

Crude oil and natural gas wells drilled offshore often have their wellheads positioned on the ocean floor. The wellhead is normally installed by mounting it on the upper end of a string of casing which is lowered into the bore hole and cemented in place. The wellhead is generally in the shape of a cylinder having a bore which is adapted to sealably support an inner concentric string of casings and casing hangers that are affixed to the casing string prior to lowering the string and seating the hanger within the wellhead. The casing hangers are adapted to be received and supported within the wellhead. Each casing hanger is provided with a packoff element around its outer periphery to provide a pressure-tight seal between the outside of the casing and the inside of the wellhead.

In many present day well completion systems annular packoff seal elements are positioned between the wellhead and each casing to provide a pressure-tight seal therebetween. It is important that gas, water and other fluids which may be forced into some of the outer casings be prevented from moving into the inner casing and that fluids from the inner casing be prevented from moving into the outer casings. Each of the packoff seals must be designed to withstand the maximum oil pressure since pressure abnormalities are controlled by closing a blowout preventer situated above the wellhead, and this will cause high pressure to be exerted across the various seals.

Some of the prior art seals include an elastomeric material which is compressed by a high pressure exerted against the elastomeric material. This high pressure forces the elastomeric material against the casing and against the wellhead to provide a seal between the casing and the wellhead. This pressure can cause gases to be forced into the elastomeric material. Any subsequent release of the pressure allows the gases to rapidly move out of the material which causes shredding and destruction of the material and causes the seal to fail.

SUMMARY OF THE INVENTION

The present invention discloses a casing seal which can be used with high pressure fluids without shredding the elastomeric portion of the seal when the high pressures are released. The casing seal includes a first annular metal ring having a generally T-shaped cross section with a stem portion of the T in a generally vertical direction and a cross bar portion of the T in a generally horizontal direction. The first metal ring is adapted for mounting between an annular well casing and a casing head with the stem portion of the T generally parallel to a vertically extending casing. First and second annular elastomeric rings are mounted adjacent to the stem portion of the T with the first elastomeric ring between the casing and the stem portion of the T, and with the second elastomeric ring between the casing head and the stem portion of the T. A second metal ring is mounted between the casing and the stem portion of the first metal ring below the first elastomeric ring. A third metal ring is mounted between the casing head and the stem portion of the first metal ring below the second elastomeric ring. An annular support is positioned beneath the second and third metal rings to support the casing seal when a downward pressure on the cross bar of the first metal ring compresses the first elastomeric ring between the first metal ring and the second metal ring to expand the first elastomeric ring against the casing, and the downward pressure also compresses the second elastomeric ring between the first metal ring and a third metal ring to expand the second elastomeric ring against the casing head. The cross bar prevents gases from moving downward into the elastomeric material and prevents shredding of the material when pressure is suddenly reduced.

BRIEF DESCRIPTION OF THE DRAWINGS

FIG. 1 is a fragmentary diagrammatic central section of a well casing and casing head in which the casing seal of the present invention can be used.

FIG. 2 is an enlargement of a portion of FIG. 1 with the casing removed.

FIG. 3 is an enlarged fragmentary perspective view of the casing seal of the present invention.

FIG. 4 is a cross section of the casing seal of the present invention.

DESCRIPTION OF THE PREFERRED EMBODIMENT

Referring now to the drawings, FIG. 1 discloses a cross sectional view of a portion of an annular casing head 10 having an upper portion 11 and a lower portion 12. Portions 11 and 12 are interconnected by a plurality of bolts 16 (only one being shown) and a plurality of nuts 17. Casing head 10 has an axially extending bore 18 having an inwardly projecting flange 22 in upper portion 11. An annular drill bit guide ring 23 having an inwardly projecting flange 24 is mounted inside bore 18 below flange 22. An annular well casing 28 is mounted inside guide ring 23 with an upper end 29 adjacent to flange 24 of guide ring 23. A hold-down nut 30 is threaded inside bore 18 at a lower end of upper portion 11 of casing head 10 to support a casing seal 34 of the present invention. Seal 34 is mounted above nut 30 in a space 35 between an outer wall 36 of casing 28 and an inner wall 37 of casing head 10. A ring gasket 41 mounted in a pair of grooves 42, 43 provides sealing between upper and lower portions 11, 12 of casing head 10. A test port 47 connected between the lower end of casing seal 34 and the outer portion of casing head 10 can be used to check for leakage from bore 18. A test port bleeder plug 48 threaded into port 47 provides a seal when leakage is not being checked.

Casing seal 34 (FIGS. 3, 4) includes a generally T-shaped annular metal ring 49 having a stem portion 53 mounted generally parallel to the vertical walls 36, 37 (FIGS. 1, 4) of casing 28 and casing head 10. A cross bar portion 54 of ring 49 having a pair of sloping surfaces 55, 56 on the underside of bar portion 54 extends at right angles to stem portion 53. A pair of elastomeric rings 60, 61 are mounted adjacent to stem portion 53 to provide a seal between casing 28 and ring 49 and between casing head 10 and ring 49. A pair of annular metal rings 62, 63 are mounted on either side of stem portion 53 and are supported by hold-down nut 30.

When fluids and/or gases under high pressure are present in bore 18 (FIGS. 1, 2) some of these fluids and gases move through a space 67 between guide ring 23 and wall 37 of casing head 10. These fluids and gases exert a downward pressure on a top portion 54a of cross bar 54 (FIGS. 2, 4) forcing cross bar 54 downward against elastomeric rings 60, 61. Since the area of upper surface 54a is greater than the area of sloping surfaces 55, 56, the pressure per square inch exerted on the elastomeric rings 60, 61 is greater than the downward pressure per square inch on top of cross bar 54. This difference in pressure could cause material in rings 60, 61 to be extruded into a space 68 between wall 36 and cross bar 54 and into a space 69 between wall 37 and cross bar 54. A pair of wedge-shaped non-extrusion rings 73, 74 move over sloping surfaces 55, 56 to press tightly against walls 36, 37 due to the upward pressure from elastomeric rings 60, 61. This prevents elastomeric material from rings 60, 61 from moving into spaces 68, 69. The greater pressure per square inch on the elastomeric rings 60, 61 cause the stress in the elastomer to be higher than the pressure applied to the upper end of seal 34 and prevents the diffusion of gas into the elastomer. This prevents shredding of the elastomer when pressure in bore 18 is suddenly reduced.

A plurality of wedge-shaped non-extrusion rings 78 - 81 (FIG. 4) prevent elastomeric material in rings 60, 61 from moving downward. A downward pressure from elastomeric ring 60 causes a lower surface 78a of non-extrusion ring 78 to slide over an upper surface 80a of non-extrusion ring 8 so ring 80 presses tightly against wall 36 and non-extrusion ring 78 passes tightly against stem 53 of ring 49. This prevents elastomeric material from being forced into a space 85 between ring 62 and wall 36 and into any space (not shown) which may develop between ring 62 and stem 53 of ring 49. Downward pressure from elastomeric ring 61 causes non-extrusion ring 79 to move tightly against stem 53 and causes non-extrusion ring 81 to move tightly against wall 37 of casing head 10. This prevents elastomeric material from being forced into a space 86 between ring 63 and wall 37 and into any space (not shown) which may develop between ring 63 and stem 53 of ring 49.

The downward pressure on cross bar 54 (FIGS. 1, 4) causes elastomeric ring 60 to be compressed between rings 78, 80 and cross bar 54 and ring 73. The compressed ring 60 presses against wall 36 of casing 28 and against stem 53 of ring 49 to provide a fluid tight seal. The downward pressure on cross bar 54 also causes elastomeric ring 61 to be compressed between rings 79, 81 and cross bar 54 and ring 74. Compressed ring 61 provides a fluid tight seal between wall 37 of casing head 10 and stem 53 of ring 49.

The present invention discloses a casing seal which can withstand high pressure and raising and lowering pressures inside the casing without damage to the seal. A multiplication of casing bore pressure prevents the diffusion of gases into an elastomeric portion of the seal and causes the elastomeric portion of the casing seal to provide a fluid tight seal. A plurality of wedge-shaped non-extrusion rings adjacent to the elastomeric portion of the seal prevents movement of the elastomer into spaces adjacent to the casing seal.

Although the best mode contemplated for carrying out the present invention has been herein shown and described, it will be apparent that modification and variation may be made without departing from what is regarded to be the subject matter of the invention.

What is claimed is:

1. A casing seal (34) for use with a source of high pressure fluid for providing high pressure sealing between an annular casing (36) and a surrounding annular casing head (37), said seal comprising:
   I. an annular metal energizing ring (49) having a generally T-shaped cross-section,
      (a) said metal energizing ring being positioned with a stem portion (53) of said T in a generally vertical direction and with a cross bar portion (54) of said T in a generally horizontal direction across a top portion of said stem,
      (b) said cross bar portion (54) of said T having first and second sloping lower surfaces (55, 56) on the underside of said cross bar (54) each on a respective side of the stem portion extending from the stem portion to the respective radial ends of said underside, and an upper surface (54a) on the top of said cross bar, the upper surface having a greater area than the combined area of said pair of sloping surfaces; and,
   II. a plurality of cooperating annular seal and support ring members disposed on either side of said metal energizing ring stem portion, including:
      (a) first and second annular resilient and deformable elastomeric rings (60, 61), said elastomeric rings being mounted adjacent to said stem portion (53) of said metal energizing ring on either side thereof,
         (i) with said first elastomeric ring (60) sealably mounted between said casing (36) and said stem portion (53) of said metal energizing ring (49) adjacent to said cross bar (54), and
         (ii) with said second elastomeric ring (61) sealably mounted between said casing head (37) and said stem portion (53) of said metal energizing ring (49) adjacent to said cross bar (54); and
      (b) first and second annular rigid metal rings (62, 63), disposed on either side of said stem portion (53) which extends between said first and second metal rings,
         (i) said first metal ring (62) being mounted between said casing (36) and said stem portion (53) of said metal energizing ring (49) below said first elastomeric ring (60),
         (ii) said second metal ring (63) being mounted between said casing head (37) and said stem portion (53) of said metal energizing ring (49) below said second elastomeric ring (61);
   III. said annular seal and support ring members having an axial extent substantially greater than the length of said metal energizing ring stem portion (53) and sufficient to insure that axial shortening of said annular seal and support ring members under compression of said elastomeric rings will result in an axial length still greater than that of said energizig ring stem portion (53);
   IV. annular support means (30) positioned beneath said first and second metal rings (62, 63) to support said casing seal (34) and to cooperate with said metal energizing ring (49) in applying compressive forces upon said first and second elastomeric rings and metal rings,
   wherein a downward pressure on said cross bar (53) of said metal energizing ring (49)
      (a) tightly compresses said first elastomeric ring (60) between said metal energizing ring (40) and said first metal ring (62) to expand said first elastomeric ring against said casing (36), and (b) said downward pressure tightly compresses said second elastomeric ring (60) between said metal energizing ring (49) and said second emtal ring (63) to expand said second elastomeric ring against said casing head (37), (c) said upper surface area on said cross bar (54) of said metal energizing ring in being greater than said lower surface area to case the pressure per square inch exerted on said elastomeric rings (60, 61) by said cross bar (54) to be greater than the pressure per square inch exerted on said upper surface (54a) of said cross bar (54) of said metal energizing ring (49);

thereby subjecting said elastomeric rings to substantial compressive forces precluding diffusion of ambient gases into said elastomeric rings, and V. said annular rings further including first and second substantially rigid and non-deformable wedge-shaped non-extrusion rings (73, 74), on either side of said stem portion (53), (a) said first non-extrusion ring (73) being mounted between said first elastomeric ring (60) and said first sloping surface (55) of said cross bar (54) of said metal energizing ring (49), wherein a downward pressure of said cross bar (54) causes a surface of said first non-extrusion ring (73) to move over said first sloping surface (55) to sealably press said first non-extrusion ring (73) against said annular casing (36), (b) said second non-extrusion ring (74) being mounted between said second elastomeric ring (61) and said second sloping surface (56) of said cross bar (54) of said metal energizing ring (49).

(c) said first and second sloping surfaces having their respective surfaces from said stem portion to their respective radial ends in engagement with rings adjacent thereto, wherein a downward pressure of said cross bar (54) causes a surface of said second non-extrusion ring (74) to move over said second sloping surface (56) to sealably pressure said second non-extrusion ring (74) against said annular casing head (37), and wherein said non-extrusion rings (73, 74) preclude any upward expansive movement therepast of said resilient and deformable elastomeric rings (60, 61) and also wherein said highly compressed elastomeric rings are free of any diffused gas tending to tear and destroy the same upon any sudden or substantial decrease in pressure above said cross bar, thereby protecting said elastomerci rings and the seal between the casing and casing head.

2. A casing seal as defined in claim 1 wherein said annular rings further include third, fourth fifth and sixth wedge-shaped non-extrusion rings, said third and said fourth non-extrusion rings (78, 80) being mounted between said first elastomeric ring (60) and said first metal ring (62), said wedge shapes thereof causing said third and said fourth non-extrusion rings (78, 80) to move relative to each other when pressure is applied causing said third non-extrusion ring (78) to press against said casing (36) and causing said fourth non-extrusion ring (80) to press against said stem portion (53) of said energizing metal energizing ring (49) when a downward pressure is applied to said upper surface (54a) of said cross bar (54), said fifth and sixth non-extrusion rings (79, 81) being mounted between said second elastomeric ring (61) and said second metal ring (63), said wedge shapes thereof causing said fifth and said sixth non-extrusion rings (79, 81) to move relative to each other when pressure is applied causing said fifth non-extrusion ring (79) to press against said casing head (10) and causing said sixth non-extrusion ring (81) to press against said stem portion (53) of said metal energizing ring (49) when a downward pressure is applied to said upper surface (54a) of said cross bar (54).

* * * * *